(12) United States Patent
Mitra

(10) Patent No.: US 6,727,841 B1
(45) Date of Patent: Apr. 27, 2004

(54) POSITION-ADAPTIVE UAV RADAR FOR URBAN ENVIRONMENTS

(75) Inventor: Atindra Mitra, Kettering, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/409,187

(22) Filed: Apr. 3, 2003

(51) Int. Cl.$^7$ .......................... G01S 13/06; G01S 13/90
(52) U.S. Cl. .................. 342/25; 342/22; 342/90; 342/191; 342/357.09
(58) Field of Search .................. 342/22, 25, 59, 342/62, 63, 65, 90, 102, 161, 179, 191, 194, 357.06, 357.08, 357.09

(56) References Cited

U.S. PATENT DOCUMENTS

| | | | | |
|---|---|---|---|---|
| 6,300,898 B1 | * | 10/2001 | Schneider et al. | 342/357.09 |
| 6,608,584 B1 | * | 8/2003 | Faulkner | 342/25 |
| 2003/0052823 A1 | * | 3/2003 | Carroll | 342/465 |
| 2003/0214431 A1 | * | 11/2003 | Hager et al. | 342/115 |

OTHER PUBLICATIONS

Stacy, N.J.S. et al., "The Global Hawk UAV Australian deployment: imaging radar sensor modifications and employment for maritime surveillance". Geoscience and Remote Sensing Symposium, IEEE International, vol.: 2, Jun. 24–28, 2002, pp.: 699–701.*

John F. et al. "Integrated design of synthetic aperture radars for unmanned aircraft", Geoscience and Remote Sensing Symposium, 'Remote Sensing for a Sustainable Future.', International, vol.: 4, May 27–31, 1996, pp. 2347–2348.*

* cited by examiner

Primary Examiner—Thomas H. Tarcza
Assistant Examiner—Isam Alsomiri
(74) Attorney, Agent, or Firm—Gina S. Tollefson; Gerald B. Hollins; Thomas L. Kundert

(57) ABSTRACT

Bistatic/multistatic radar system concept for purposes of interrogating difficult and obscured targets in urban environments via the application of low-altitude "smart" or "robotic-type" unmanned air vehicle platforms. A significant aspect of the invention is the formulation of a unmanned air vehicle system concept that implements self-adaptive positional adjustments based on sensed properties such as phase discontinuities of the propagation channel.

12 Claims, 3 Drawing Sheets

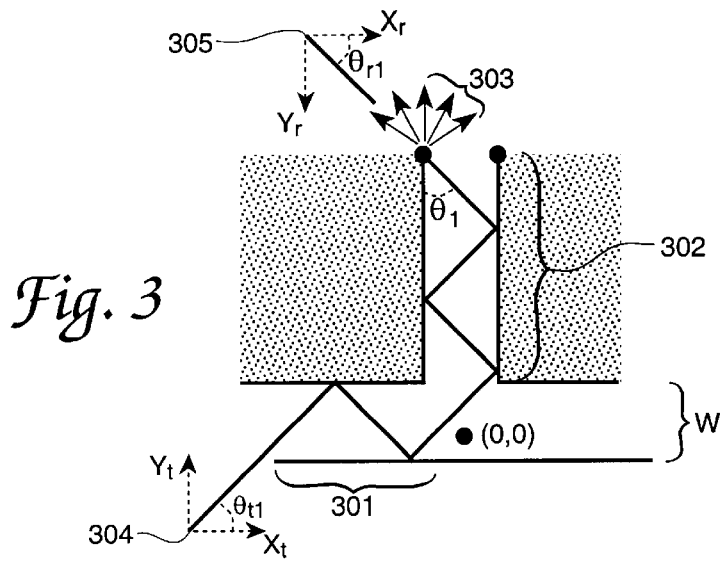
Fig. 3
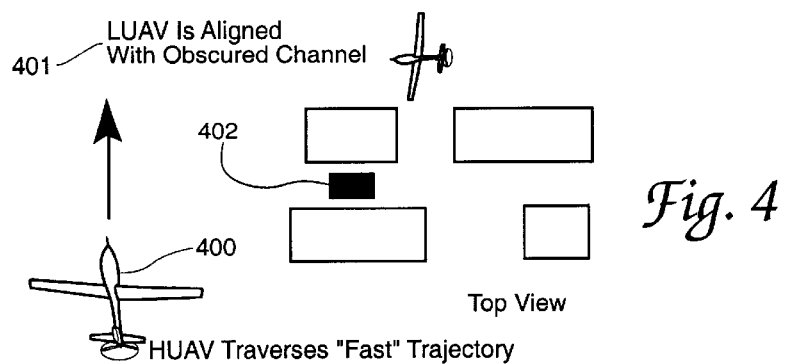
Fig. 4
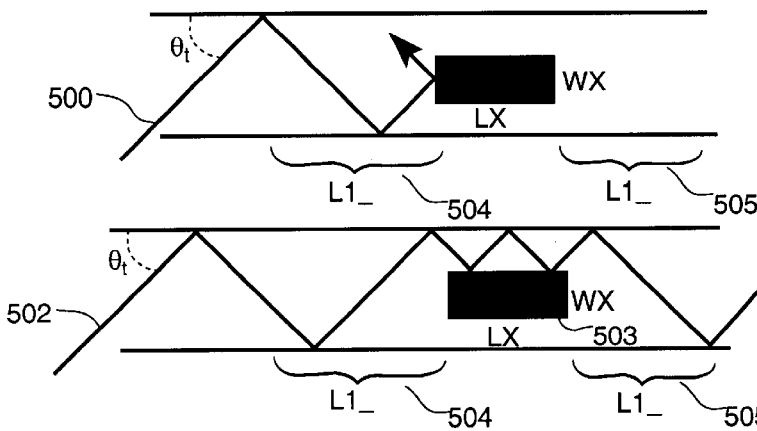
Fig. 5a
Fig. 5b

POSITION-ADAPTIVE UAV RADAR FOR URBAN ENVIRONMENTS

RIGHTS OF THE GOVERNMENT

The invention described herein may be manufactured and used by or for the Government of the United States for all governmental purposes without the payment of any royalty.

BACKGROUND OF THE INVENTION

Conventional techniques for detecting obscured targets employ some form of "human intelligence" where "a priori" information is gathered over a period of time by one of the intelligence agencies. If a threat is detected as a result of these intelligence gathering procedures, military or paramilitary forces are often employed at the risk of injury. In extreme cases even loss of life may be incurred. Also, expensive equipment may become severely damaged or unrecoverable.

On the technology forefront, advanced Automatic Target Recognition (ATR) research in the last decade or so has been focused on developing Synthetic Aperture Radar (SAR) and Electro-Optics (EO) along with other imaging technologies for specific reconnaissance and surveillance platforms. Recent advances have led to a limited number of automated techniques for detecting targets in open terrain and over a limited number of benign conditions. For situations that require the detection of obscured targets, recent initiatives such as development efforts for Foliage Penetration (FP) and Ground Penetrating Radar (GPR) show promise as future technologies to detect targets within forest clutter and obtain signal information from underground facilities, respectively. At present, these technologies have a great deal of scope for further development and are not fully mature for even initial implementation. Realistic possibilities for near-term exploitation of these technologies require a considerable amount of human-in-the-loop intervention to combine information from a variety of sources.

In the present invention, a bistatic/multistatic radar system concept is described for purposes of interrogating difficult and obscured targets via the application of low-altitude "smart" or "robotic-type" unmanned air vehicle (UAV) platforms. A significant aspect of the invention is the formulation of a UAV system concept that implements self-adaptive positional adjustments based on sensed properties of the propagation channel (i.e. phase discontinuities). The present invention adapts the concept of a notational urban environment as illustrated in the sample scene of FIG. 1.

SUMMARY OF THE INVENTION

A bistatic/multistatic radar system concept for purposes of interrogating difficult and obscured targets via the application of low-altitude "smart" or "robotic-type" unmanned air vehicle (UAV) platforms. A significant aspect of the invention is the formulation of a UAV system concept that implements self-adaptive positional adjustments based on sensed properties of the propagation channel (i.e. phase discontinuities).

It is therefore an object of the invention to provide a bistatic/multistatic radar system concept for purposes of interrogating difficult and obscured targets via the application of low-altitude "smart" or "robotic-type" unmanned air vehicle (UAV) platforms.

It is another object of the invention to provide a bistatic/multistatic radar system concept for purposes of interrogating difficult and obscured targets via the application of low-altitude "smart" or "robotic-type" unmanned air vehicle (UAV) platforms that implement self-adaptive positional adjustments based on sensed properties of the propagation channel.

It is another object of the invention to provide a bistatic/multistatic radar system concept for purposes of interrogating difficult and obscured targets via the application of low-altitude "smart" or "robotic-type" unmanned air vehicle (UAV) platforms developed by deriving approximate electromagnetic signal models based on the uniform theory of diffraction.

These and other objects of the invention described in the description, claims and accompanying drawings are achieved by a multi-mode, radar method for detecting targets in urban environments comprising the steps of:

transmitting an electromagnetic signal from a high altitude unmanned air vehicle to an urban environment including between buildings;

receiving by a low altitude unmanned air vehicle a plurality of electromagnetic rays from said electromagnetic signal from said transmitting step, said electromagnetic signal diffracting and reflecting off buildings in said urban environment, an electric field at said low altitude unmanned air vehicle defined as $$E_r = E_t A_t \sum_{s=1}^{S} \left( \prod_{m_s}^{M_s} A_R \overline{R} \right) \left( \prod_{n_s}^{N_s} A_D \overline{D} \right) \exp(-jkd_s)$$

where $E_r$ is the received electric field $E_t$ is the transmitted electric field S is the number of signal paths from transmitter to receiver $\overline{R}$ is the reflection coefficient at $M_s$ reflection points in the s_th signal path $\overline{D}$ is the diffraction coefficient at $N_s$ diffraction points in the s_th signal path $A_t$ is the spatial attenuation factor from transmitter to first reflection point $A_R$ is the spatial attenuation factor for reflection points $A_D$ is the spatial attenuation factor for diffraction points $d_s$ is the length of s_th signal path;

compensating for phase deviation in said electromagnetic signal transmitted from said high altitude unmanned air vehicle and received by said low altitude unmanned air vehicle;

determining signal differential path lengths by measuring the phase difference between high altitude unmanned air vehicle electromagnetic signals and electric field phase measurements at said low altitude unmanned air vehicle, said signal differential path lengths indicating an obstruction embedded within said urban environment; and monitoring said signal differential path lengths and said low altitude unmanned air vehicle converging to a vicinity of said obstruction.

BRIEF DESCRIPTION OF THE DRAWINGS

FIG. 3 shows a geometry for the sample urban scenario of FIG. 2.

FIG. 4 shows a two-dimensional view of signature exploitation geometry.

FIG. 5a shows a signal path with an embedded object as a function of transmitter trajectory.

FIG. 5b shows a signal path with an embedded object as a function of beam angle.

DETAILED DESCRIPTION

Figure 1:
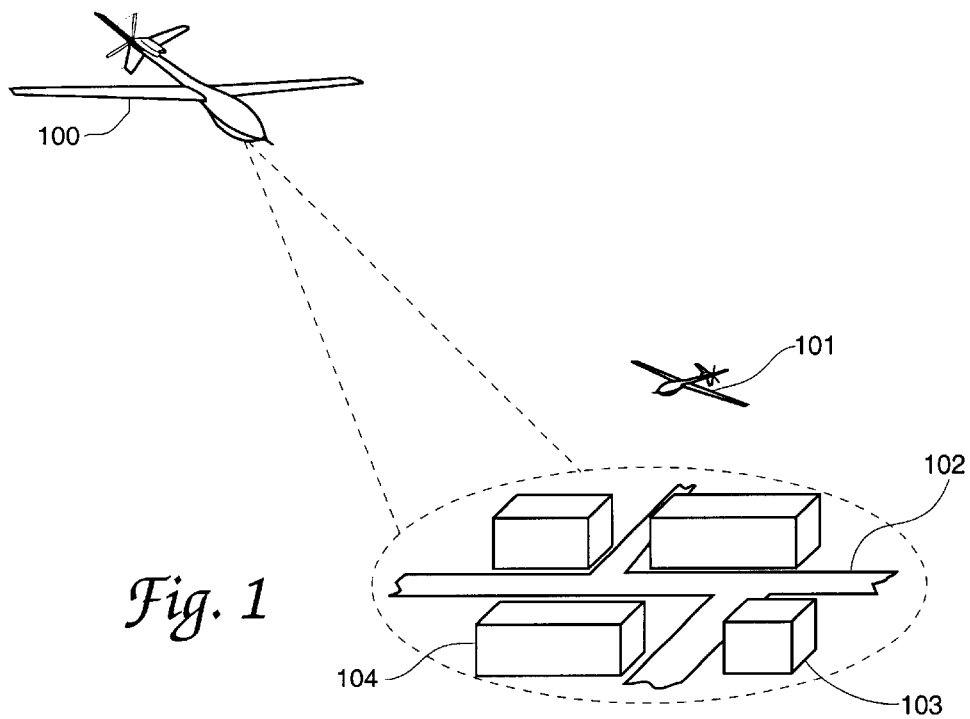
FIG. 1 shows a sample urban scenario for demonstration of "position-adaptive" UAV concept.

In the present invention, a bistatic/multistatic radar system concept is described for purposes of interrogating difficult and obscured targets via the application of low-altitude "smart" or "robotic-type" unmanned air vehicle (UAV) platforms. A significant aspect of the invention is the formulation of a UAV system concept that implements self-adaptive positional adjustments based on sensed properties of the propagation channel (i.e. phase discontinuities). The present invention adapts the concept of a notational urban environment as illustrated in the sample scene of FIG. 1. In FIG. 1, the high altitude radiating unmanned air vehicle platform (HUAV) is illustrated at 100 and the low altitude unmanned air vehicle (LUAV) radiating platform is illustrated at 101. In FIG. 1, the dark lines 102 represent streets and the boxes represent buildings, two of which are illustrated at 103 and 104. The LUAV "position-adaptively" converges to line-of-sight (LOS) locations for objects that are embedded between buildings 103 and 104. Computation of a real-time on-board parameter computation for the LUAV denoted as "signal differential path length" allows the LUAV to position-adaptively converge to a location between two buildings.

Figure 2:
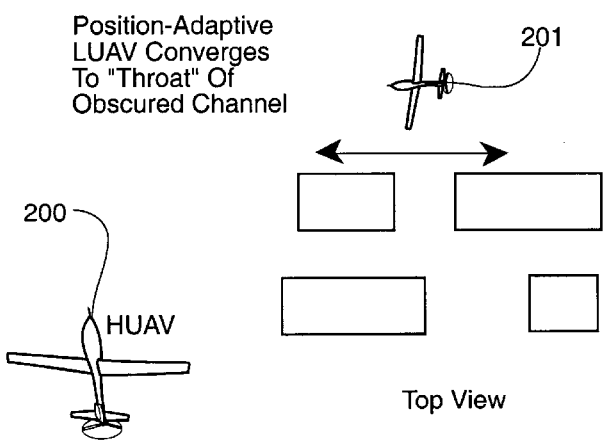
FIG. 2 shows a two-dimensional "ground plane" projection of FIG. 1 for purposes of developing analytical signal models.

FIG. 2 illustrates a two-dimensional "ground plane" projection of FIG. 1 for purposes of developing analytical signal models. The HUAV is shown at 200 and the position-adaptive LUAV 201 converges to a "throat" of an obscured channel. For purposes of analyzing basic electromagnetic trends in signals that propagate in an urban environment such as in FIG. 2, approximate electromagnetic signal models can be derived via application of the uniform theory of diffraction (UTD). The UTD expression for the electric field at the LUAV can be expressed as follows:

$$E_r = E_t A_t \sum_{s=1}^{S} \left( \prod_{m_s}^{M_s} A_R \overline{R} \right) \left( \prod_{n_s}^{N_s} A_D \overline{D} \right) \exp(-jkd_s) \quad \text{(Eq. 1)}$$

where $E_r$ is the received electric field $E_t$ is the transmitted electric field S is the number of signal paths from transmitter to receiver $\overline{R}$ is the reflection coefficient at $M_s$ reflection points in the s_th signal path $\overline{D}$ is the diffraction coefficient at $N_s$ diffraction points in the s_th signal path $A_t$ is the spatial attenuation factor from transmitter to first reflection point $A_R$ is the spatial attenuation factor for reflection points $A_D$ is the spatial attenuation factor for diffraction points $d_s$ is the length of s_th signal path The geometry of the sample urban scenario of FIG. 2 for this analysis is illustrated in FIG. 3. FIG. 3 illustrates the two ray paths that are considered for purposes of deriving approximate signal models. The first ray path is illustrated at 304 and the second ray path is illustrated at 303. The two ray paths correspond to multiple reflections from the building walls and single diffractions from one of the two building edges formed at the radiating aperture along the signal path shown at 303 in FIG. 3. In FIG. 3, the transmitter coordinates for the HUAV illustrated at 304 are denoted as $(x_t, y_t)$ and the receiver coordinates on the LUAV illustrated at 305 are denoted as $(x_r, y_r)$. Expressions for the electric field at the LUAV can be derived by setting S=2, $N_s$=1 in Eq. 1 and evaluating the canonical product terms by splitting the ray paths into segments. For example, for the street segments labeled 301 and 302 in FIG. 3, $$d_1 = d_{t1} + dL1_1 + dL12_1 + dL2_1 + d_{r1} \quad \text{(Eq. 2)}$$

Here, the subscript 1 denotes the ray path traced by diffraction from the left building edge shown at 303 in FIG. 3. The analysis for diffraction from the right building edge shown at 302 is analogous and the equations can be denoted with the subscript 2. The following equations for the multiple ray segments are developed from a straightforward geometrical analysis. This approach is used to develop the computations in the next section.

$$d_{t1} = \frac{y_{t1} + \frac{W}{2}}{\sin(\theta_{t1})} \quad \text{(Eq. 3)}$$

$$\Delta_{L1} = \frac{W}{\cot(\phi_1)}, \Delta_{L2} = \frac{W}{\tan(\phi_1)} \quad \text{(Eq. 4)}$$

$$\Delta_{R1} = \frac{W}{\cos(\phi_1)}, \Delta_{R2} = \frac{W}{\sin(\phi_1)} \quad \text{(Eq. 5)}$$

$$M_{L1} = \frac{L1}{\Delta_{L1}}, M_{L2} = \frac{L2}{\Delta_{L2}}, \quad \text{(Eq. 6)}$$

$$dL1_1 = M_{L1}\Delta_{R1} = \frac{L1}{\sin(\phi_1)} \quad \text{(Eq. 7)}$$

$$dL1_2 = M_{L2}\Delta_{R2} = \frac{L2}{\cos(\phi_1)} \quad \text{(Eq. 8)}$$

$$dL12_1 = \Delta_{R1} - \Delta_{R2} \quad \text{(Eq. 9)}$$

$$d_{r1} = \sqrt{\left(y_{r1} - L2 - \frac{W}{2}\right)^2 + \left(x_{r1} + \frac{W}{2}\right)^2} \quad \text{(Eq. 10)}$$

These expressions can be applied to Eq. 1 to obtain compact expressions for the canonical product terms. For example, the canonical product terms for the building reflectivity and attenuation coefficients can be expressed as follows:

$$\left( \prod_{m_s}^{M_s} A_R \overline{R} \right) = \left( \frac{\overline{R}}{\Delta_{R1}} \right)^{M_{L1}} \left( \frac{\overline{R}}{\Delta_{R2}} \right)^{M_{L2}} \quad \text{(Eq. 11)}$$

For analytical purposes, the building edges can be approximated as a perfectly conducting "wedge" and the diffraction coefficient in Eq. 12 can be expressed as follows:

$$\overline{D}_1 = \frac{\exp\left(-j\frac{\pi}{4}\right)\frac{1}{n}\sin\left(\frac{\pi}{n}\right)}{\sqrt{2\pi k}} \cdot P(\phi, \phi') \quad \text{(Eq. 12)}$$

where $$P(\phi, \phi') = \begin{bmatrix} \dfrac{1}{\cos\left(\dfrac{\pi}{n}\right) - \cos\left(\dfrac{\phi' - \phi}{n}\right)} - \\ \dfrac{1}{\cos\left(\dfrac{\pi}{n}\right) - \cos\left(\dfrac{\phi' + \phi}{n}\right)} \end{bmatrix}$$

$$n\pi = \frac{3\pi}{2}$$

defines the exterior angle for the building corners, $$\phi_1 = \frac{\pi}{2} - \theta_{tl},\ \phi'_1 = \frac{\pi}{2} + \theta_{rl},\ \text{and } \theta_{rl} = \frac{\pi}{2} - \operatorname{atan}\left(\frac{y_r - L_2 - \frac{W}{2}}{x_r - \frac{W}{2}}\right).$$

For the arrangement of the invention, one of the predominant characteristics of the signal model of Eq. 12 is the phase term. The "signal path length" for this phase term is expressed by Eq. 2 for ray path 1 (e.g. diffraction from the left building edge). The concept can be defined for this urban application by considering a notional HUAV platform that traverses a trajectory at moderate velocity and with a "phase motion compensation" with respect to a given point within the HUAV trajectory. Under these conditions, and combined with the observation that the HUAV may be located at a relatively far standoff range (e.g. the angular coverage rate of the HUAV is slow), the first four terms of Eq. 2 are approximately equal for any two "phase motion compensated" points on the somewhat localized HUAV trajectory. If this somewhat localized points on the HUAV trajectory correspond to E-field phase measurements on the LUAV, the phase difference between successive measurements is proportional to a quantity denoted as "signal differential path length".

The "signal differential path length" is proportional to the fifth term in Eq. 2 and is expressed in Eq. 10 for ray path 1. Under this two-ray-path signal model, the "signal differential path length" for ray path two is proportional to $$d_{r2} = \sqrt{\left(y_{r2} - L2 - \frac{W}{2}\right)^2 + \left(x_{r2} - \frac{W}{2}\right)^2} \quad \text{(Eq. 13)}$$

Under these given conditions, if the LUAV loiters back and forth in front of the "radiating aperture" between the two buildings of interest with a given $y_{r1} \approx Y_{r2}$, the average "signal differential path length" between the two ray paths can be expressed as follows:

$$d_{AVE} = \sqrt{\left(y_r - L2 - \frac{W}{2}\right)^2 + (x_r)^2} \quad \text{(Eq. 14)}$$

From inspection, Eq. 14 is minimized when $x_r = 0$. Therefore, with this "position-adaptive" system, a LUAV can loiter back and forth and then converge to a location between two buildings of interest by performing real-time onboard calculations of "signal differential path length". Alternatively, a LUAV can also measure the phase discontinuities between the two ray paths in the signal model of Eq. 1 to converge to a location between the buildings. This can enable a LUAV to interrogate the region for embedded objects of interest.

Under the "position-adaptive" systems concept, after the LUAV converges to the vicinity of an embedded channel, the LUAV enters a close-range interrogation mode with an on-board low-power active radar or ladar sensor. In this section, a bistatic approach to interrogating the embedded channel is described that allows the LUAV to remain passive. The two-dimensional geometry for analysis and development of this approach is shown in FIG. 4. An embedded target is shown at 402 as a rectangular box. The HUAV is shown at 400 and the LUAV, which is aligned with an obscured channel, is shown at 401. The target 402 is not within the line-of-sight of either the LUAV or the HUAV.

Under this approach, the system enters a second mode after the LUAV has already "position-adaptively" converged to a location between buildings. In this second mode, the LUAV hovers in the vicinity of the channel opening, as shown at 401 in FIG. 4, and the HUAV 400 flies a "fast trajectory" in order to generate a signal signature from the embedded target as a function of HUAV transmitter angle. This technique is denoted as "exploitation of leakage signals via path trajectory diversity" (E-LS-PTD).

FIGS. 5a and 5b illustrate two geometries that fall within the trajectory of the HUAV. FIG. 5a shows a signal path 500 with embedded object 501 as a function of transmitter trajectory and FIG. 5b shows a signal path 502 as a function of beam angle. An analysis of this concept is again performed with electromagnetic signal models. For example, the "backscatter" condition in FIG. 5a is predicted from the following logical operation and application of Eq. 6:

$$\text{IF } \operatorname{frac}\left(M_{L1\_1} = \frac{L1\_1}{\Delta_{LI}}\right) > .25 \text{ AND} \quad \text{(Eq. 15)}$$

$$\operatorname{frac}\left(M_{L1\_1} = \frac{L1\_1}{\Delta_{LI}}\right) < .75$$

$$E_r == 0$$

Under this approach, the system enters a second mode after the LUAV has already "position-adaptively" converged to a location between buildings. In this second mode, the LUAV hovers in the vicinity of the channel opening and the HUAV flies a "fast trajectory" in order to generate a signal signature from the embedded target as a function of HUAV transmitter angle. This technique is denoted as "exploitation of leakage signals via path trajectory diversity" (E-LS-PTD).

Figure 6:
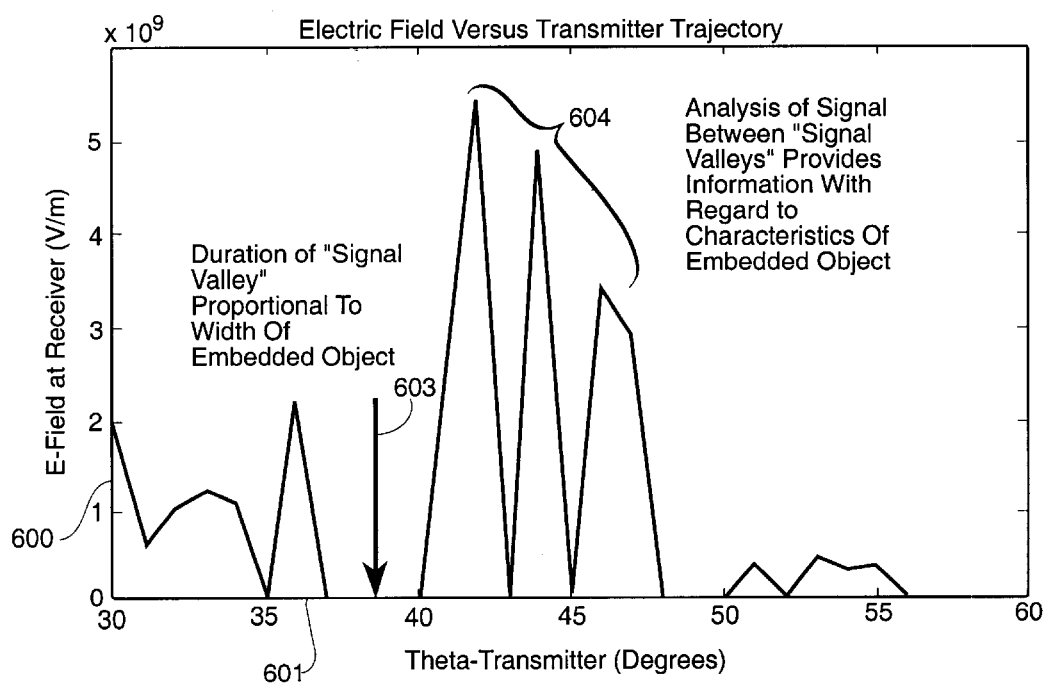
FIG. 6 shows a graph of an electric field signal as a result of computations with signal models.

Signal models for the "forward-scatter" condition of FIG. 5b are computed by coding Eqs. 1–10 for simulating two ray paths. Street L1 in FIGS. 5a and 5b is split into sections L1_1, LX, and L1_2 illustrated at 504 and 505 and the formulas are applied to each of these three sections separately. FIG. 6 is a plot of the electric field computation at a receiver as a function of transmitter beam angle (from 30 to 60 degrees). The x-axis at 601 represents beam angle in degrees and the y-axis at 600 represents electric field at the low altitude unmanned air vehicle in units of Volts per meter. The "signal valley" proportional to the width of the embedded object from FIG. 4 is illustrated at 603 in FIG. 6. In contrast, the electric field peaks at 604 in FIG. 6 illustrates the signal between "signal valleys" which provides information with regard to characteristics of embedded objects. FIG. 6 illustrates a notional building reflectivity of 1 and a notional target reflectivity of 0.5. Some of the additional notional systems and geometrical parameters used for this computation are as follows:

Xmitter Ave. Power: 10 KW
Signal Frequency: 10 GHz
Xmitter Antenna Gain: 30 dB
Xmitter Range in x-dir: 5 Km
Receiver Range in y-dir: 500 m
L1=100 m, L2=100 m, W=20 m
LX=25 m, WX=10 m, L1_2=37.7 m Observation of this plot indicates that the duration of the "signal valley" is proportional to WX and the duration of the signal between the neighboring "signal valleys" is proportional to LX. The ratio of the duration of these two signal segments is approximately equal to the ratio of LX and WX. This notional set of computations is intended to show that signals from the E-LS-PTD technique can be processed to estimate parameters for embedded objects of interest.

In summary, the present invention provides a "position-adaptive" bistatic radar system concept for low-altitude near-range sensing applications. This system concept is developed for applications where a target or object of interest is embedded in an obscured channel. In the present arrangement of the invention, an outdoor urban environment was considered. Future investigations, simulations, and data collections are planned for further development and maturation of this concept in an outdoor urban environment as well as for interrogation of indoor urban environments, tunnels, embedded cavities, and other challenging cluttered environments. Other arrangements of the invention could include, for monitoring indoor environments, three spatial degrees of freedom (including elevation) instead of two. With this approach, the LUAV can be positioned along the line-of-sight of, for example, a window of a particular floor to investigate the possible characterization of objects and personnel within buildings. In order to analyze these types of environments, the approximate signal models that were developed for this investigation will need to be modified to accommodate lower-frequency signals with transmission coefficients that penetrate or "leak" through the outer structures of buildings. In additional arrangements of the invention there are a number of options for generalizing the E-LS-PTD technique to estimate target and object characteristics in three dimensions as well as to estimate more complex characteristics for moving and stationary targets. These options include applying additional spatial degrees of "position adaptation" as in the indoor case as well as via implementing additional "smart" flight paths for the LUAV after the LUAV converges to "look down the throat" of an obscuration channel. In addition, strategies for employing multiple UAVs are under consideration. Technology challenges in this new area include further characterization of signal strengths as a function of environmental material properties and relative distance of separation between the platforms. There is also potential for the development of advanced signal processing techniques for purposes of extracting additional information for a target or object of interest. Future plans include the implementation of a series of high-fidelity simulations and measurements in an effort to further develop this concept for a variety of challenging environments.

While the apparatus and method herein described constitute a preferred embodiment of the invention, it is to be understood that the invention is not limited to this precise form of apparatus or method and that changes may be made therein without departing from the scope of the invention, which is defined in the appended claims.

I claim:

1. A multi-mode, radar method for detecting targets in urban environments comprising the steps of:

transmitting an electromagnetic signal from a high altitude unmanned air vehicle to an urban environment including between buildings;

receiving by a low altitude unmanned air vehicle a plurality of electromagnetic rays from said electromagnetic signal from said transmitting step, said electromagnetic signal diffracting and reflecting off buildings in said urban environment, an electric field at said low altitude unmanned air vehicle defined as $$E_r = E_t A_t \sum_{s=1}^{S} \left( \prod_{m_s}^{M_s} A_R \overline{R} \right) \left( \prod_{n_s}^{N_s} A_D \overline{D} \right) \exp(-jkd_s)$$

$E_r$ is the received electric field
$E_t$ is the transmitted electric field
S is the number of signal paths from transmitter to receiver
$\overline{R}$ is the reflection coefficient at $M_s$ reflection points in the s_th signal path
$\overline{D}$ is the diffraction coefficient at $N_s$ diffraction points in the s_th signal path
$A_t$ is the spatial attenuation factor from transmitter to first reflection point
$A_R$ is the spatial attenuation factor for reflection points
$A_D$ is the spatial attenuation factor for diffraction points
$d_s$ is the length of s_th signal path;

compensating for phase deviation in said electromagnetic signal transmitted from said high altitude unmanned air vehicle and received by said low altitude unmanned air vehicle;

determining signal differential path lengths by measuring the phase difference between high altitude unmanned air vehicle electromagnetic signals and electric field phase measurements at said low altitude unmanned air vehicle, said signal differential path lengths indicating an obstruction embedded within said urban environment; and monitoring said signal differential path lengths and said low altitude unmanned air vehicle converging to a vicinity of said obstruction.

2. The multi-mode, radar method of claim 1 for detecting targets in urban environments wherein said receiving step further comprises receiving a plurality of electromagnetic rays from said electromagnetic signal diffracting from building edges and reflecting from building walls in said urban environment.

3. The multi-mode, radar method of claim 1 for detecting targets in urban environments further comprising, after said determining step, the steps of:

loitering back and forth by said low altitude unmanned air vehicle; and converging to a location between two buildings of interest by performing real-time onboard calculations of said signal differential path length.

4. A multi-mode radar device for detecting targets in urban environments comprising:

a high altitude unmanned air vehicle for transmitting an electromagnetic signal to an urban environment including between buildings;

a low altitude unmanned air vehicle receiving a plurality of electromagnetic rays resulting from said electromagnetic signal diffracting and reflecting off urban buildings;

means for phase deviation determination between said electromagnetic signal transmitted from said high altitude unmanned air vehicle and received by said low altitude unmanned air vehicle;

means for determining signal differential path lengths by measuring the phase difference between high altitude unmanned air vehicle electromagnetic signals and electric field phase measurements at said low altitude unmanned air vehicle, said signal differential path lengths indicating an obstruction embedded within said urban environment; and means for processing said signal differential path lengths whereby said low altitude unmanned air vehicle converges to a vicinity of said obstruction.

5. The multi-mode radar device of claim 4 for detecting targets in urban environments further comprising:

on-board low power active radar on said low altitude unmanned air vehicle for close range interrogation of said obstruction;

a signal signature generated from said embedded obstruction as a function of said high altitude unmanned air vehicle transmitter angle by said high altitude unmanned air vehicle flying a fast trajectory, and electric field computing means at said low altitude unmanned air vehicle based on said signal signature.

6. The multi-mode radar device of claim 5 for detecting targets in urban environments wherein said on-board low power active radar on said low altitude unmanned air vehicle for close range interrogation further comprises lasar radar.

7. The multi-mode radar device of claim 5 for detecting targets in urban environments wherein said signal signature includes backscattered and front scattered signals.

8. The multi-mode radar device of claim 4 for detecting targets in urban environments wherein said electric field phase measurements at said low altitude unmanned air vehicle are defined as $$E_r = E_t A_t \sum_{s=1}^{S} \left( \prod_{m_s}^{M_s} A_R \overline{R} \right) \left( \prod_{n_s}^{N_s} A_D \overline{D} \right) \exp(-jkd_s)$$

$E_r$ is the received electric field
$E_t$ is the transmitted electric field
S is the number of signal paths from transmitter to receiver
$\overline{R}$ is the reflection coefficient at $M_s$ reflection points in the s_th signal path
$\overline{D}$ is the diffraction coefficient at $N_s$ diffraction points in the s_th signal path
$A_t$ is the spatial attenuation factor from transmitter to first reflection point
$A_R$ is the spatial attenuation factor for reflection points
$A_D$ is the spatial attenuation factor for diffraction points
$d_s$ is the length of s_th signal path.

9. A multi-mode, radar method for detecting targets in urban environments comprising the steps of:

transmitting an electromagnetic signal from a high altitude unmanned air vehicle to an urban environment including between buildings;

receiving by a low altitude unmanned air vehicle a plurality of electromagnetic rays from said electromagnetic signal from said transmitting step, said electromagnetic signal diffracting and reflecting off buildings in said urban environment, an electric field at said low altitude unmanned air vehicle defined as $$E_r = E_t A_t \sum_{s=1}^{S} \left( \prod_{m_s}^{M_s} A_R \overline{R} \right) \left( \prod_{n_s}^{N_s} A_D \overline{D} \right) \exp(-jkd_s)$$

$E_r$ is the received electric field
$E_t$ is the transmitted electric field
S is the number of signal paths from transmitter to receiver
$\overline{R}$ is the reflection coefficient at $M_s$ reflection points in the s_th signal path
$\overline{D}$ is the diffraction coefficient at $N_s$ diffraction points in the s_th signal path
$A_t$ is the spatial attenuation factor from transmitter to first reflection point
$A_R$ is the spatial attenuation factor for reflection points
$A_D$ is the spatial attenuation factor for diffraction points
$d_s$ is the length of s_th signal path;

compensating for phase deviation in said electromagnetic signal transmitted from said high altitude unmanned air vehicle and received by said low altitude unmanned air vehicle;

determining signal differential path lengths by measuring the phase difference between high altitude unmanned air vehicle electromagnetic signals and electric field phase measurements at said low altitude unmanned air vehicle, said signal differential path lengths indicating an obstruction embedded within said urban environment;

monitoring said signal differential path lengths and said low altitude unmanned air vehicle converging to a vicinity of a channel embedded with an obstruction;

close range interrogating of said obstruction by said low altitude unmanned air vehicle with on-board low power active radar;

generating a signal signature from said embedded obstruction as a function of said high altitude unmanned air vehicle transmitter angle by said high altitude unmanned air vehicle flying a fast trajectory, and computing electric field at said low altitude unmanned air vehicle based on said signal signature.

10. The multi-mode, radar method for detecting targets in urban environments of claim 9 wherein said close range interrogating step further comprises close range interrogating of said obstruction by said low altitude unmanned air vehicle with on-board ladar sensor.

11. The multi-mode, radar method for detecting targets in urban environments of claim 9 wherein said signal signature from said generating step is backscattered signal.

12. The multi-mode, radar method for detecting targets in urban environments of claim 9 wherein said signal signature from said generating step is a forward scattered signal.

* * * * *